(12) United States Patent
Madsen

(10) Patent No.: US 11,623,369 B2
(45) Date of Patent: Apr. 11, 2023

(54) GRIPPING DEVICE FOR LIFTING A PREFORM FOR A WIND TURBINE BLADE

(71) Applicant: LM WIND POWER A/S, Kolding (DK)

(72) Inventor: Kristian Lehmann Madsen, Kolding (DK)

(73) Assignee: LM WIND POWER A/S, Kolding (DK)

(*) Notice: Subject to any disclaimer, the term of this patent is extended or adjusted under 35 U.S.C. 154(b) by 0 days.

(21) Appl. No.: 17/434,456

(22) PCT Filed: Mar. 5, 2020

(86) PCT No.: PCT/EP2020/055854
§ 371 (c)(1),
(2) Date: Aug. 27, 2021

(87) PCT Pub. No.: WO2020/178387
PCT Pub. Date: Sep. 10, 2020

(65) Prior Publication Data
US 2022/0143874 A1    May 12, 2022

(30) Foreign Application Priority Data
Mar. 5, 2019    (EP) .................................... 19160690

(51) Int. Cl.
*B29C 31/08*        (2006.01)
*B29C 70/30*        (2006.01)
(Continued)

(52) U.S. Cl.
CPC ............... *B29C 31/08* (2013.01); *B29C 70/30* (2013.01); *B29C 70/541* (2013.01); *B29K 2067/00* (2013.01); *B29L 2031/085* (2013.01)

(58) Field of Classification Search
None
See application file for complete search history.

(56) References Cited

U.S. PATENT DOCUMENTS

| 4,236,854 A | 12/1980 | Rogers |
| 8,814,558 B2 | 8/2014 | Schibsbye |

(Continued)

FOREIGN PATENT DOCUMENTS

| DE | 102007020898 A1 | 10/2007 |
| EP | 3357644 A1 | 8/2018 |

(Continued)

OTHER PUBLICATIONS

Machine translation of DE102007020898A (Year: 2007).*
Extended European Search Report dated Sep. 30, 2019 corresponding to application No. 19160690.4-1019.

*Primary Examiner* — Barbara J Musser
(74) *Attorney, Agent, or Firm* — Nath, Goldberg & Meyer; Tanya E. Harkins; Morgan D. Rosenberg

(57) ABSTRACT

A gripping device (76) is provided for lifting a preform for a wind turbine blade from a preform mould (71). The gripping device (76) comprises a base frame (62), a plurality of arms (78) slidably mounted on the base frame (62), each arm (78) having a proximal end and a distal end, a plurality of gripping members (86) for gripping a top surface (75) of the preform. The vertical position of one or more arms (78) of the gripping device (76) relative to the base frame (62) may change when lowering the gripping device (76) towards a preform to reflect the top surface (75) of the perform.

15 Claims, 7 Drawing Sheets

Figure 1:
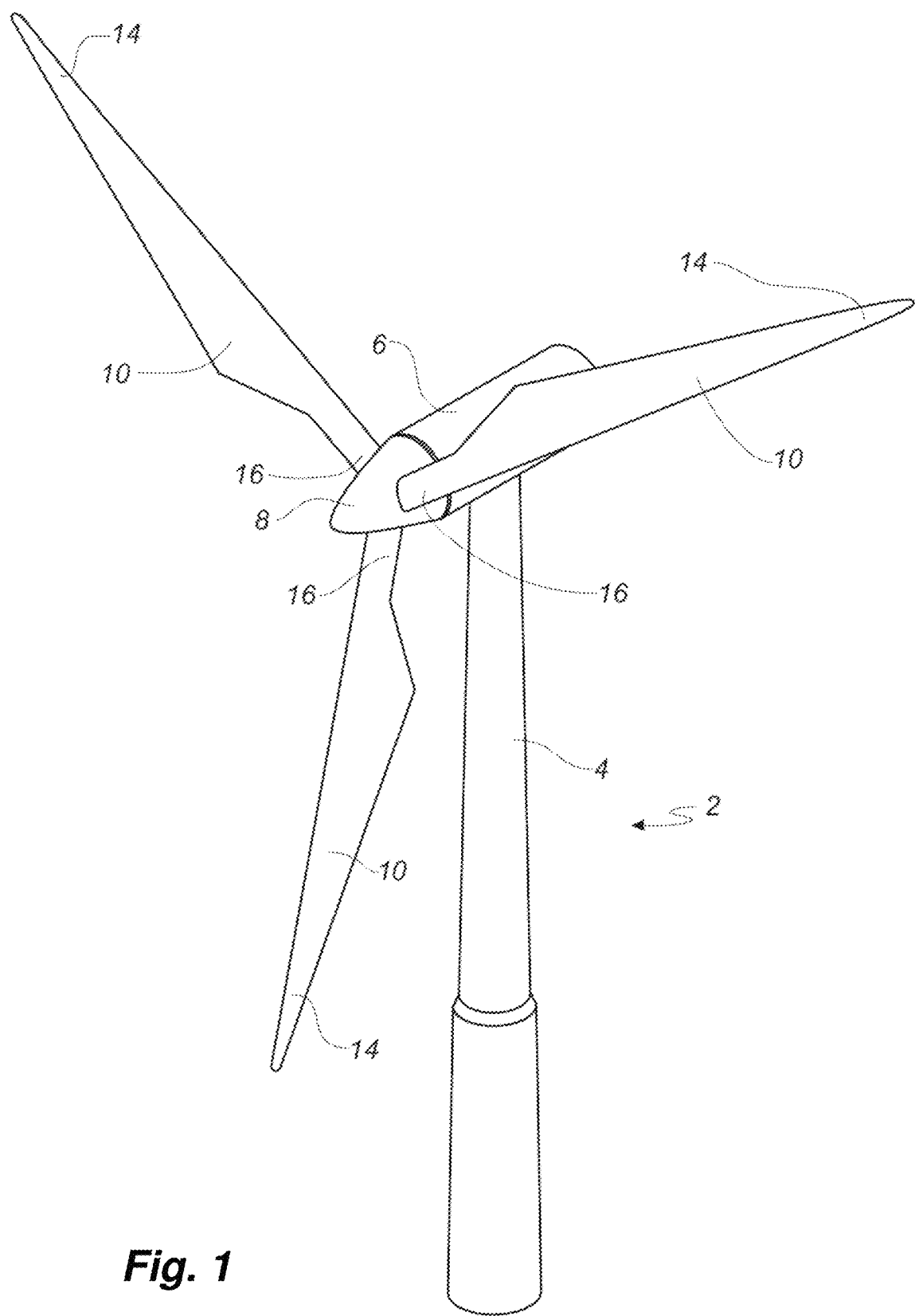

(51) Int. Cl.
  B29C 70/54 (2006.01)
  B29K 67/00 (2006.01)
  B29L 31/08 (2006.01)

(56) References Cited

U.S. PATENT DOCUMENTS

2005/0042323 A1    2/2005  Habisreitinger et al.
2015/0314583 A1\*  11/2015  Jess ................... B25J 9/0084
                                                                          414/222.01

FOREIGN PATENT DOCUMENTS

EP        3360671 A1    8/2018
GB        2543843 A  \*  5/2017  ............. B23P 15/04

\* cited by examiner

GRIPPING DEVICE FOR LIFTING A PREFORM FOR A WIND TURBINE BLADE

This is a National Phase Application filed under 35 U.S.C. 371 as a national stage of PCT/EP2020/055854, filed Mar. 5, 2020, an application claiming the benefit of European Application No. 19160690.4, filed Mar. 5, 2019, the content of each of which is hereby incorporated by reference in its entirety.

FIELD OF THE INVENTION

The present invention relates to a gripping device for lifting a preform for a wind turbine blade from a preform mould, to a method of transferring a preform for a wind turbine blade, and to a method of manufacturing a wind turbine blade part

BACKGROUND OF THE INVENTION

Wind is an increasingly popular clean source of renewable energy with no air or water pollution. When the wind blows, wind turbine rotor blades spin clockwise, capturing energy through a main shaft connected to a gearbox and a generator for producing electricity. Rotor blades of modern wind turbines are carefully designed to maximise efficiency. Modern rotor blades may exceed 80 metres in length and 4 metres in width.

Wind turbine rotor blades are typically made from a fibre-reinforced polymer material, comprising a pressure side shell half and a suction side shell half, also called blade halves. The cross-sectional profile of a typical blade includes an airfoil for creating an air flow leading to a pressure difference between both sides. The resulting lift force generates torque for producing electricity.

The shell halves of rotor blades are often manufactured using blade moulds. First, a blade gel coat or primer is applied to the mould. Subsequently, fibre reinforcement and/or fabrics are placed into the mould followed by resin infusion. A vacuum is typically used to draw epoxy resin material into a mould. Alternatively, prepreg technology can be used in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by being glued or bolted together substantially along a chord plane of the blade.

In these blade manufacturing processes, the use of preforms becomes increasingly important. A preform is a shaped arrangement of fibres, such as multiple layers thereof, which has been bound and/or consolidated for later use as part of the fibre lay-up in the blade mould. The rationale for using preforms for blade manufacturing is to reduce cycle time in the blade mould. In addition, using preforms may reduce the number of required repairs due to the pre-consolidated structure of the preforms. As blade lengths increase, using preforms for blade lay-up adds efficiency and precision.

Typically, multiple preforms will be used in manufacturing a wind turbine blade, whereas sometimes only one preform is used for each shell. This usually requires large space for manufacturing and for storing the preforms. In addition, the manufacturing of preforms of different shapes and sizes can be time-consuming and expensive. Providing moulds for manufacturing preforms can be tedious and costly, which applies even more if preforms of various shapes and curvatures are required. Equipment for handling such various preforms will often take up a large space during storage.

A shell half of a modern wind turbine blade may comprise different preforms of 20 or more slightly different geometries, which provides certain challenges in particular with regard to transferring the different preforms from their respective preform moulds to the blade mould. One solution may be design a plurality of different transfer jigs adapted to the various preform geometries. However, this may be a tedious and costly process. In addition, new modifications will have to be made for each new preform geometries.

It is therefore a first object of the present invention to provide a cost-efficient way of transferring preforms for wind turbine blade parts for their respective preform mould to the blade mould.

It is a further object of the present invention to provide a flexible and efficient tool for such processes.

It is another object of the present invention to provide an improved method of manufacturing a wind turbine blade using preforms with various geometries.

SUMMARY OF THE INVENTION

The present invention addresses one or more of the above-discussed objects by providing a gripping device for lifting a preform for a wind turbine blade from a preform mould, the gripping device comprising a base frame, a plurality of arms slidably mounted on the base frame, each arm having a proximal end and a distal end, a plurality of gripping members for gripping a top surface of the preform, each gripping member being attached to the distal end of at least one of the arms, a plurality of lock members, each lock member being engaged with at least one of the arms for allowing sliding motion, preferably vertical sliding motion, of the arm relative to the base frame in a first direction while preventing sliding motion, preferably vertical sliding motion, of the arm relative to the base frame in a second direction.

The gripping device of the present invention is found to be flexible and efficient in catering to various preform geometries, while not relying on complex control systems or computer-generated adaptions. Thus, a single gripping device can be used for gripping and transferring preforms of different shape and curvature as the arms are slidable relative to the base frame in a first direct direction, preferably an upward direction. Since sliding motion of the arms relative to the base frame in a second, preferably a downward direction, is prevented, the positions of the individual arms relative to the base frame can be conserved for the next transfer of a preform of the same shape. The gripping device of the present invention is thus able to provide a memory function, albeit not relying on complex control mechanisms such as computational means. This makes the gripping device a cost-efficient, flexible and efficient tool for transferring wind turbine blade preforms.

The gripping device of the present invention is useful for lifting a preform for a wind turbine blade from its preform mould and for transferring said preform to a wind turbine blade mould, such as a blade mould for a shell half. In such processes, the gripping device may be suspended from a crane or other lifting device. For that purpose, the gripping device may comprise an attachment eye, an attachment ring, or the like, for receiving a crane hook, lifting sling or the like.

The base frame preferably comprises a plurality of vertically extending beams and a plurality of horizontally extending beams, such as steel beams. The horizontally extending beams may include longitudinally oriented beams and transversely oriented beams which extend substantially perpendicular to the longitudinally oriented beams.

In a preferred embodiment, the base frame, or a part attached to the base frame, further comprises one or more pivot connectors, or parts thereof, adapted for being received in a socket member attached to a wind turbine blade mould. The socket member may be attached to an edge or a rim of a wind turbine blade mould, i.e. a mould for moulding a wind turbine blade shell half. The socket member may be affixed to a support or pole member for attachment to a blade mould. Thus, when the preform held by the gripping device is suspended above a blade mould, one or more of the pivot connectors, or parts thereof, may be received in one or more socket member attached to the blade mould, such that the perform can be pivoted by simply lowering the gripping device with a crane above the blade mould, without the need for further turning devices. In some embodiments, the pivot connector comprises a ball member such as a hitch ball for a ball-and-socket hitch. In some embodiments, the base frame comprises one or more horizontally extending sheath members, such as two horizontally extending sheath members arranged to receive respective support members, such as angled support members, each support member carrying a pivot connector, or a part thereof, in the form of a ball member at its distal end. In this way, both the longitudinal and transverse location can be secured in a poka-yoke fashion.

The gripping device of the present invention also comprises a plurality of arms slidably, preferably vertically slidably, mounted on the base frame, either directly or via one more support members or fixtures, such as one or more horizontally extending support members. Preferably, each arm is slidable in a vertical direction, such as in an upward direction. Each arm has a proximal end, which during operation is at the top of the device, i.e. nearest to the ceiling, and a distal end, which during operation is at the bottom of the device, i.e. nearest to the floor or to the preform top surface.

A gripping member is preferably attached to the distal end of an arm, wherein the gripping member is suitable for gripping, i.e. attaching itself to, a top surface of the preform. A lock member is engaged with the arm for allowing sliding motion of the arm relative to the base frame in a first direction, preferably in an upward direction, while preventing sliding motion of the arm relative to the base frame in a second direction, preferably in a downward direction. Thus, in a preferred embodiment, the first direction is an upward direction and the second direction is a downward direction.

Preferably, the lock member comprises, or consists of, a ratchet or a brake member. The lock member is advantageously arranged to prevent linear movement of the arm in one direction and to allow linear movement of the arm in the opposite direction relative to the base frame.

In some embodiments, each arm is individually slidable relative to the base frame. This ensures that even complex top surfaces or shapes of a preform can be accurately engaged by each of the arms carrying the respective gripping members. Such individual arrangement of the vertical position of each arm relative to the base frame provides an elegant shape memory solution, ensuring that preforms of the same shape can be transferred from their respective preform moulds without altering the respective arm positions and without any need to control the same through complex control units or computational means.

In some embodiments, the gripping device comprises at least three arms, such as at least five arms, with respective gripping members being attached to the distal end of the respective arms. In some embodiments, the gripping device comprises between 8 and 400, more preferably 10-300 arms, most preferably 100-200 arms, with respective gripping members being attached to the distal end of the respective arms.

In a preferred embodiment, the gripping device may be provided as a modular system, wherein the base frame is created from a plurality of equal modules and wherein all arms are alike.

According to another embodiment, each arm is slidably mounted within a slot arranged on the base frame. The slot may be provided by a fixture or bracket attached to the base frame, for example, via a horizontally extending support member or bar. Preferably, the arm may slide upward within the slot, while downward movement is prevented.

In a preferred embodiment, sliding motion of the arms relative to the base frame is achieved exclusively by gravity. Once an arm has engaged the preform top surface via its gripping member, the arm will preferably slide upward relative to the base frame when lowering the latter. In other words, sliding motion of the arms relative to the base frame is preferably achieved by lowering the base frame while one or more of the arms are engaged with, or pushed back by, the preform top surface. Thus, no actuation means other than a crane or lifting device suspending the gripping device is needed to achieve relative movement of the arms in relation to the base frame. Thus, preferably, the positions of the arms relative to the base frame is set/defined by the top surface geometry of the preform.

It is preferred that the vertical positions of the arms relative to the base frame are not controlled by a computer or a control unit. The gripping device of the present invention thus provides a simple, yet efficient solution for custom-tailoring the gripping device to virtually all possible preform geometries.

In an alternative embodiment, the arms are actuated by one or more pistons, such as pneumatic pistons, wherein the lock members comprise at least one valve for preventing sliding motion of the arm relative to the base frame in a second direction.

In some embodiments, a programmable logic controller may be used to control whether the pistons should be in an entirely retracted or in an entirely extending position. Also, pistons can be used to create a threshold on the needle gripper while injecting the needles.

It is preferred that the gripping member is a needle gripper, such as a pneumatic needle gripper. The needle gripper preferably comprises a plurality of gripping needles which can be retracted into and extended from a gripper base part or a gripper housing. The gripping member is advantageously suitable for gripping a preform comprising a fabric, one or more fibre materials, and/or other materials that can be penetrated by needles. Useful needle grippers are disclosed in US 2016/0257509 A1 and U.S. Pat. No. 8,104,807 B2.

In another embodiment, the gripping member comprises a vacuum cup. In some embodiments, some of the gripping members are needle grippers, and some of the gripping members are vacuum cups.

In some embodiments, the gripping member releasably attaches to the preform upon contact with the top surface of the preform. Preferably, one or more needles of the gripping member penetrate the preform or a layer thereof.

Preferably, each arm is slidably arranged in a bracket or fixture mounted on the base frame. In one embodiment, the bracket or fixture comprises the lock member. In some embodiments, the base frame is suspended from a lifting device such as a crane or a hoist.

In another aspect, the present invention relates to a method of transferring a preform for a wind turbine blade, the method comprising
- suspending a gripping device according to the present invention over the preform,
- lowering the gripping device towards a top surface of the preform until one or more of the gripping members engage the top surface of the preform,
- raising the gripping device with the engaged preform,
- arranging the engaged preform within a wind turbine blade mould, and
- disengaging the preform.

The preform will typically be transferred from a preform mould, in which the preform was formed, to a blade mould for moulding a shell half, such as an upwind or downwind shell half, of a wind turbine blade or to a mould for a full blade. The preform may thus be released in a blade mould in a substantial horizontal orientation, a substantially vertical orientation or some intermediate orientation between vertical and horizontal. The gripping device of the present invention is preferably suspended from a crane or similar lifting device.

The step of lowering and/or raising the gripping device is preferably carried out using a crane or similar lifting device for varying the suspension height of the gripping device relative to the preform. Preferably, the gripping device is lowered towards the top surface of the preform until each of the gripping members engage the top surface of the preform.

Preferably, each of the arms is locked in a vertical direction when raising the gripping device with the engaged preform, such that the arms are prevented from moving downwards relative to the base frame. When arranged in a wind turbine blade mould, preferably for manufacturing a blade shell half, the preform may be disengaged by retracting the needles of the respective gripping members from the preform.

In a preferred embodiment, one or more of the arms of the gripping device are pushed upwards relative to the base frame by the engaged preform top surface during the step of lowering the gripping device. Thus, preferably the one or more arms maintain their vertical position relative to the preform while the base frame of the gripping device is further lowered towards the preform top surface. It is thus particularly preferred that, the vertical position of one or more arms of the gripping device relative to the base frame changes during the lowering step. This is because a rigid mould and a rigid gripping tool would require a very high manufacturing tolerance, or alternatively very high loads would be transferred in the first arm touching the mould.

In a preferred embodiment, downward movement of one or more of the arms relative to the base frame is prevented by the lock members.

In some embodiments, arranging the engaged preform within a wind turbine blade mould includes tilting or turning the preform by using a pivot connector between the gripping device and the blade mould. The pivot connector may comprise a ball member for being received in a socket member, the latter being preferably attached to an edge of the wind turbine blade mould. Preferably, the socket member is affixed to a pole member at the edge of the blade mould. In some embodiments, the pole member is height-adjustable. The ball member may be received in the socket, and subsequently the gripping device may be further lowered toward the moulding cavity of the blade mould to tilt the preform and to arrange the preform in the mould cavity.

In another aspect, the present invention relates to a method of manufacturing a wind turbine blade part, the method comprising:
- manufacturing one or more preforms of a wind turbine blade part in a preform mould,
- transferring each preform to a blade mould using the method of the present invention,
- infusing resin into the blade mould,
- curing or hardening the resin in order to form the blade part.

The wind turbine blade part is preferably a shell half of a blade, such as a downwind shell half or an upwind shell half. In some embodiments, the method of manufacturing a wind turbine blade part may involve arranging preforms in a prefab mould with subsequent infusing of resin and curing for manufacturing sub parts for later blade assembly. In some embodiments, the wind turbine blade part is a root laminate, a main laminate or a part thereof. In another embodiment, the blade part is a blade half. In other embodiments, the blade part is a full blade.

Typically, the resin infusion step comprises vacuum assisted resin transfer moulding. In a preferred embodiment, the resin dissolves the binding agent of the preform. Other embodiments involve chemical binding, for example for epoxy or thermoset resins. The resin for injecting the preform during the manufacturing of wind turbine blade parts, such as a root laminate, may be an epoxy, a polyester, a vinyl ester or another suitable thermoplastic or duroplastic material. In other embodiments, the resin may be a thermosetting resin, such as epoxy, vinyl ester or polyester, or a thermoplastic resin, such as nylon, PVC, ABS, polypropylene or polyethylene.

Preferably, the preform to be used in the present methods is a consolidated arrangement of material comprising fibres, such as glass fibres, and a binding agent. The preform will typically be used for manufacturing a blade half of a wind turbine blade. The preforms can be used in a subsequent blade moulding process as part of the fibre lay-up in the blade mould, such as a blade half mould. The preforms used according to the present invention can be placed within the root region of a blade mould, thus constituting part of the root laminate. The root region may correspond to a region of the blade having a substantially circular or elliptical cross-section. However, the preforms could also be used for other parts and regions of a wind turbine blade, such as trailing edge or leading-edge reinforcements or adhesive flanges. Alternatively, the preforms could be used for a full blade layup.

When manufacturing large blade halves, the fibre layup in the blade mould at the root end may be challenging. Preforms may have to be arranged on almost vertically extending blade mould walls. Thus, in some embodiments, the methods of the present invention comprise engaging a part of a blade mould, e.g. an edge or rim thereof, comprising a socket member, with one or more pivot connectors, or parts thereof, fastened to the gripping device prior to further lowering the gripping device relative to the blade mould. The pivot connector, or part thereof, such as a ball member is adapted for being received in the socket member attached to the wind turbine blade mould.

In one embodiment, the preform mould has a length L of between 15 and 30 meters. In some embodiments, the preform mould has a length-width ratio of at least 3:1 or at least 4:1. In other embodiments, the preform mould has a length-width ratio of at least 5:1, such as at least 10:1. In a preferred embodiment, the preform mould has a length-width ratio of at least 15:1.

In a preferred embodiment, each of the preforms is configured to form a blade section starting from the root end of the wind turbine blade. Thus, preferably each of the preforms is configured to be arranged at the root end of the blade mould. Most preferably, the preform is configured to form a subsection of the root section extending from the root end of the blade together with other subsections of the root section equally extending from the root end of the blade. In some embodiments, the preform mould comprises a moulding surface configured for the manufacturing of respective subsections of a wind turbine blade, each subsection extending from the root end of the wind turbine blade. In some embodiments, the preform mould has a concave, or inwardly curved, moulding surface.

The method of manufacturing a wind turbine blade part of the present invention will usually comprise laying up additional material, such as fibre material, in the blade mould together with the preform(s). The preform will typically include fibre material and a binding agent to form the preform. Preferably, the fibre material and the binding agent are heated using one or more heating devices, such as an oven. Preferably, a binding agent is added to the fibres prior to the heating step. Such binding agent is preferably present in an amount of 0.1-15 wt % relative to the weight of the fibre material. The binding agent may also be present in an amount of 10-20 gram per square meter of glass surface. The fibre material may include fibre rovings, such as glass fibre rovings. The binding agent of the preform can be added simultaneously with the fibres or subsequently to fibre lay-up. The binding agent is preferably present in an amount of 0.1-15 wt % relative to the weight of the fibre material. The binding agent may also be present in an amount of 5-40, preferably 10-20, gram per square meter of glass surface. In preferred embodiments, the binding agent is present in an amount of 0.5-5 wt %, preferably 0.5-2.5 wt %, relative to the weight of the fibre material. Advantageously, the binding agent is a thermoplastic binding agent. The binding agent may comprise a polyester, preferably a bisphenolic polyester.

In a preferred embodiment, the heating of the fibre material and the binding agent to form the preform takes place at a temperature of between 40 and 160° C., preferably between 90 and 160° C. An example of a suitable binding agent for the preform is a polyester marketed under the name NEOXIL 940. Examples include NEOXIL 940 PMX, NEOXIL 940 KS 1 and NEOXIL 940 HF 2B, all manufactured by DSM Composite Resins AG. Another example is a polyester resin marketed under the name C.O.I.M. FILCO® 661 FPG 005, which is a bisphenolic unsaturated polyester resin in powder form. Preferably, the binding agent is a polyester, preferably a bisphenolic polyester. In other embodiments, the binding agent is a hotmelt adhesive or based on a prepreg resin.

According to another embodiment, the binding agent is a thermoplastic binding agent. Typically, the fibre rovings are at least partially joined together by means of the binding agent by thermal bonding. In a preferred embodiment, the binding agent is a binding powder, such as a thermoplastic binding powder. In one embodiment, the preforms of the present invention essentially consist of the fibre material and the binding agent. This means that the preforms contain no more than 10 wt %, preferably not more than 5 wt % or not more than 1 wt %, of material other than fibre material and binding agent relative to the total weight of the preform. According to another embodiment, the preform consists of the fibre material and the binding agent.

In another embodiment, the fibre material used for the preforms of the present invention essentially consists of glass fibres. This means that the fibre material contains not more than 10 wt %, preferably not more than 5 wt % or not more than 1 wt %, of material other than glass fibres relative to the total weight of the fibre material. According to another embodiment, the fibre material consists of glass fibres.

In one embodiment, the binding agent is present in an amount of 1-6 wt % relative to the weight of the fibre material. According to another embodiment, the melting point of the binding agent is between 40° and 220 ° C., preferably between 40 and 160 ° C. According to another embodiment, the binding agent comprises a polyester, preferably a bisphenolic polyester. In one embodiment of the present invention, each preform essentially consists of the fibre material and the binding agent. According to another embodiment, the fibre material comprises fibre rovings, preferably glass fibre rovings. In other embodiments, the fibre material may comprise carbon fibres or a hybrid material. According to another embodiment, the fibre material comprises a fibre fabric, such as a fibre mat. In another embodiment, a preform may further comprise at least one fibre fabric such as a fibre mat. Fibre rovings may be arranged on top and/or below such fabric.

In a preferred embodiment, the preforms used in the afore-mentioned methods are used as part of the root region of a wind turbine blade, such as the root laminate. The root region may extend up to 40 meters, such as up to 25 meters, from the root end of the blade, as seen in its longitudinal direction. In other embodiments, the root region may extend to the shoulder of the blade +/−5 meters. However, the preforms could also be used for other parts and regions of a wind turbine blade. In other embodiments, the preforms manufactured according to the afore-mentioned method are used over a length of 10-35% of the total blade length. In another embodiment, the preforms manufactured according to the afore-mentioned method are used in a region of the blade extending between its root end and a shoulder of the blade.

It will be understood that any of the above-described features may be combined in any embodiment of the gripping device and related methods of the present invention. In particular, features and embodiments described with regard to the gripping device may also apply to the method of transferring a preform and to the method of manufacturing a wind turbine blade part.

The present invention also relates to a blade part, such as a blade half, obtainable by the method of manufacturing a wind turbine blade part.

As used herein, the term "wt %" means weight percent. The term "relative to the weight of the fibre material" means a percentage that is calculated by dividing the weight of an agent, such as a binding agent, by the weight of the fibre material. As an example, a value of 1 wt % relative to the weight of the fibre material corresponds to 10 g of binding agent per kilogram of fibre material.

As used herein, the term "longitudinal" means an axis or direction running substantially parallel to the maximum linear dimension of the element in question, for example a strip member or a preform mould.

As used herein, the term "horizontal" means that the direction of movement is generally parallel with respect to the ground. As used herein, the terms "vertical", "downwardly" and "upwardly" refer to directions of movement which is generally perpendicular with respect to the ground.

As used herein, the term "proximal" refers to a location with respect to the arm of the gripping device that, during normal use, is closest to the suspension point or hook of the gripping device as held by a crane or hoist. By contrast, the term "distal" refers to a location with respect to the arm of the gripping device that, during normal use, is closest to the preform. During normal use of the gripping device of the present invention, an upward direct is the direction from the distal end, closest to the preform, towards the proximal end of the arm or gripping device, while a downward direction is the opposite direction.

DETAILED DESCRIPTION OF THE INVENTION

Figure 2:
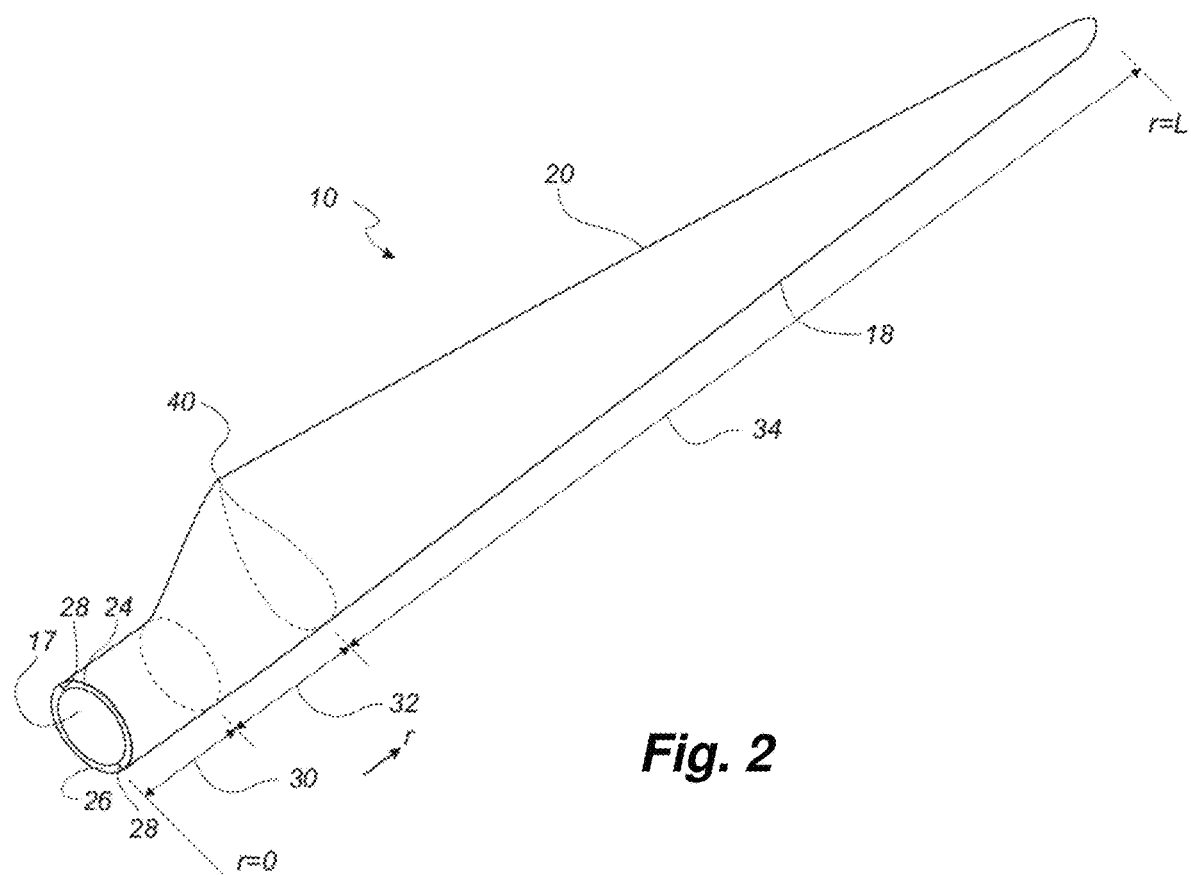
Figure 3:
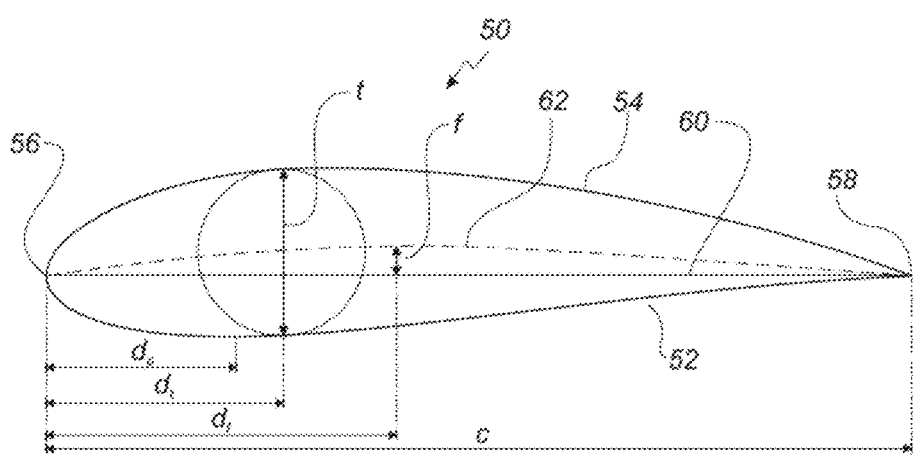
Figure 4:
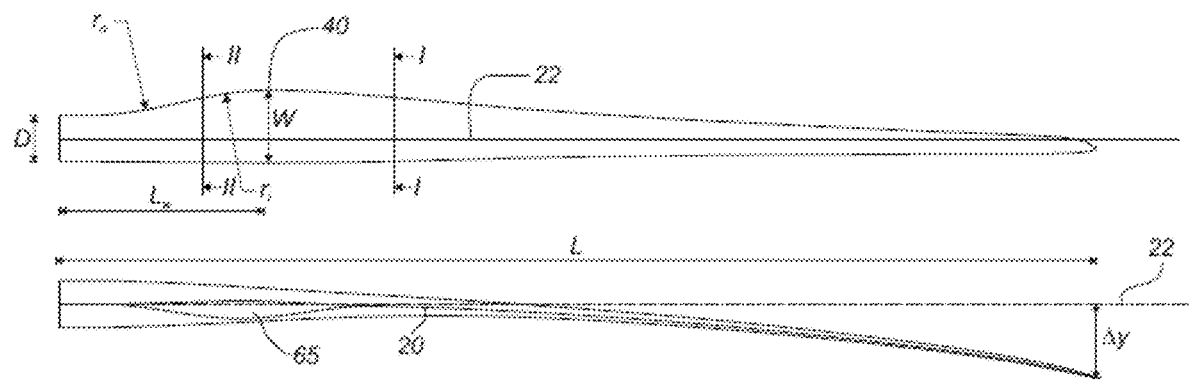
Figure 5:
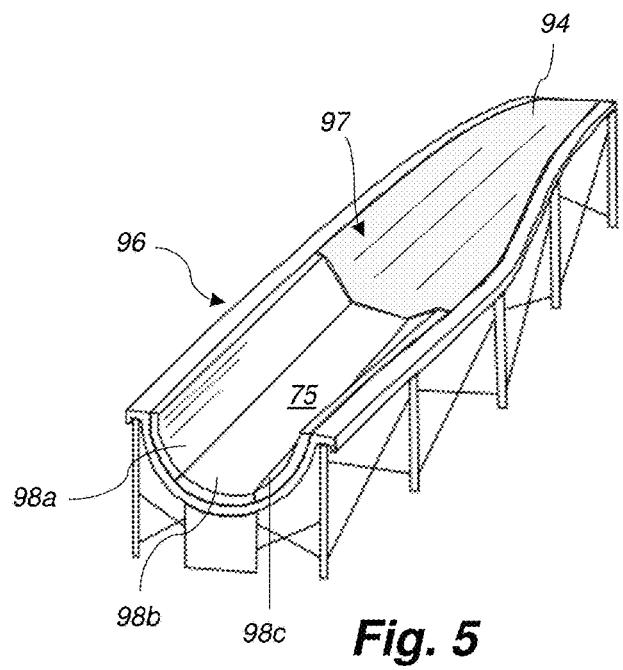
Figure 6:
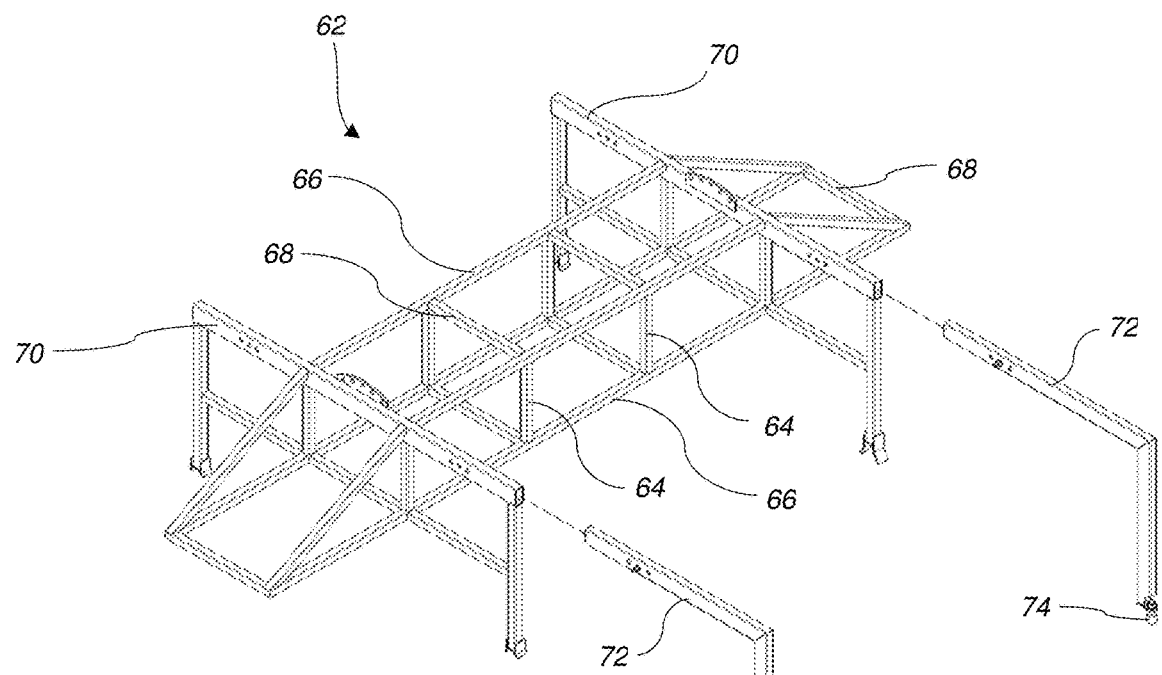
Figure 7:
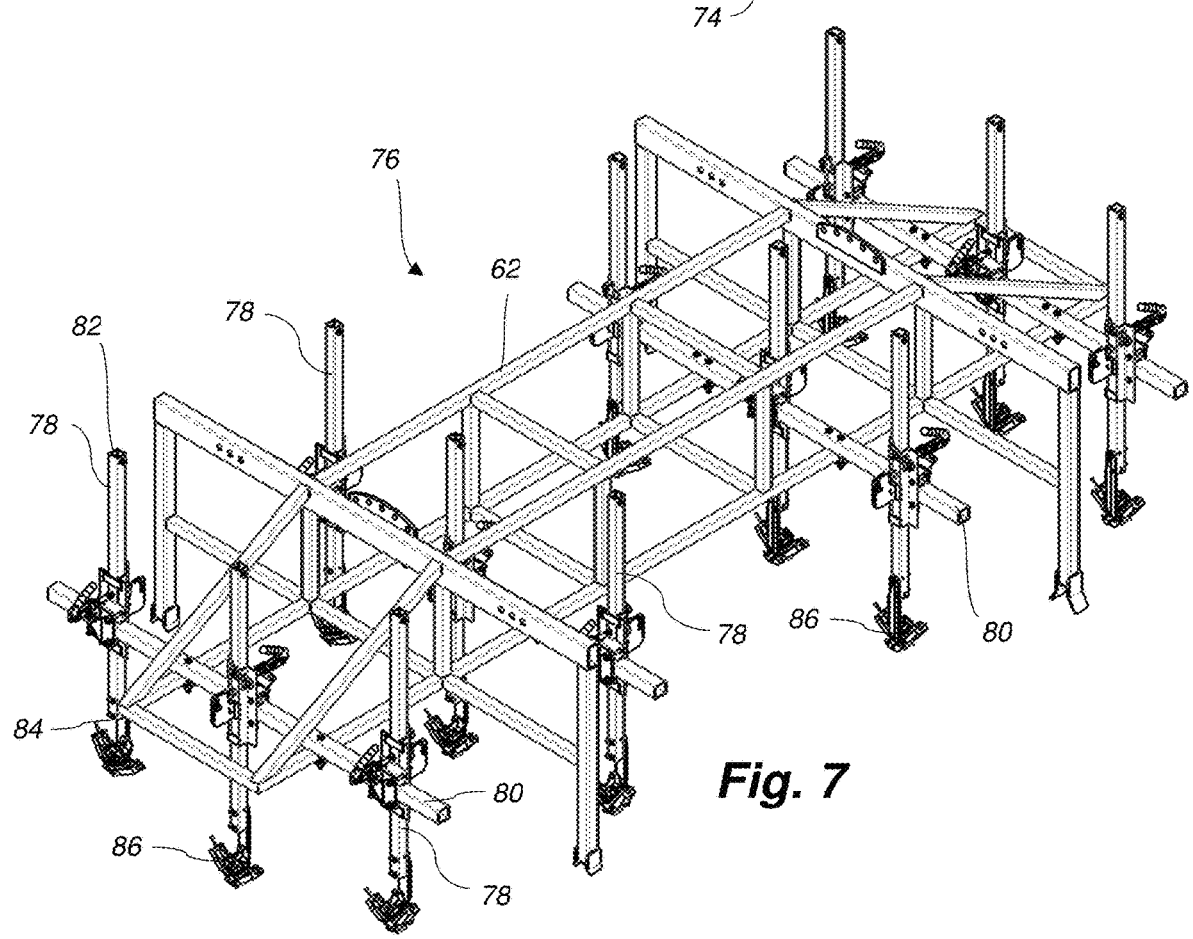
Figure 8:
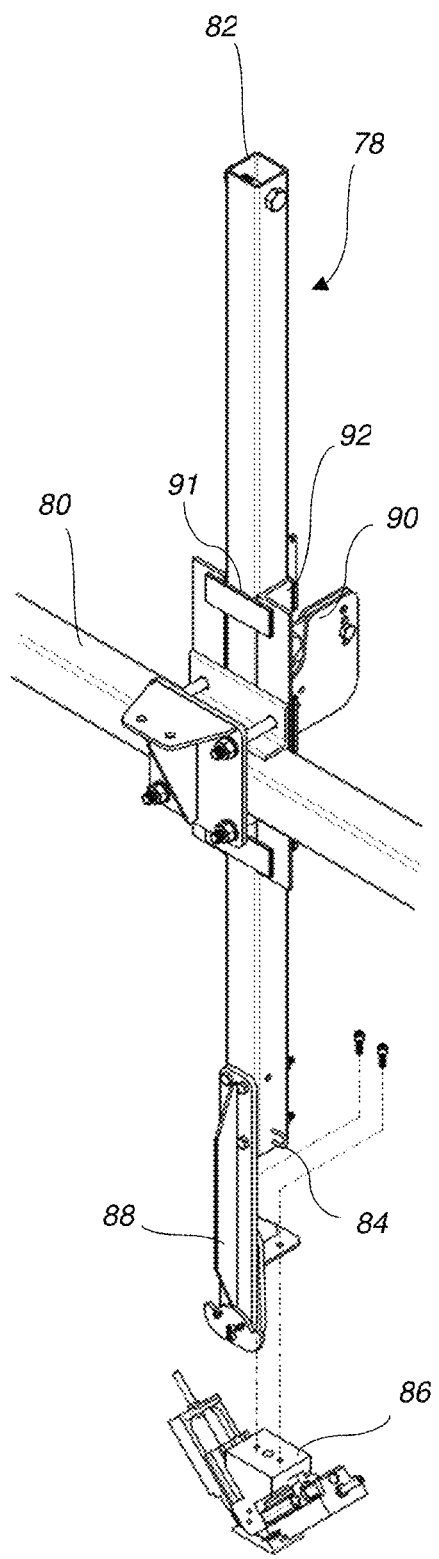
Figure 9:
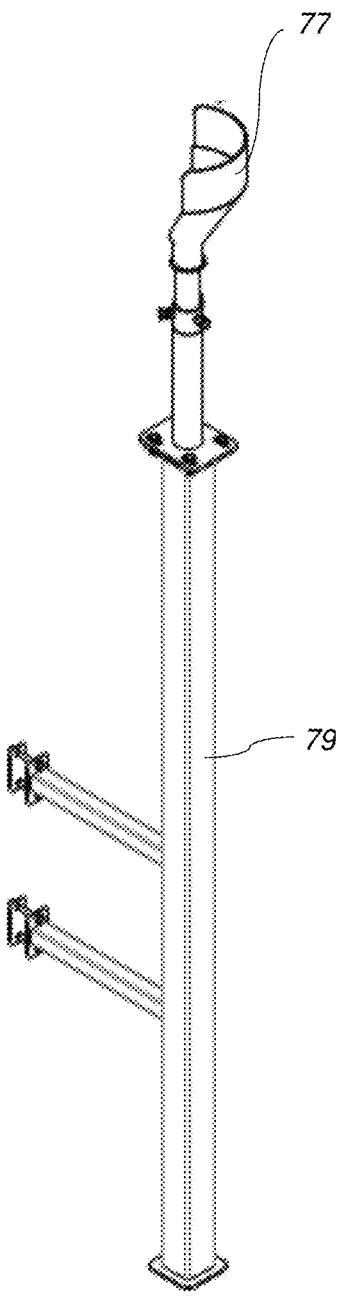
Figure 10:
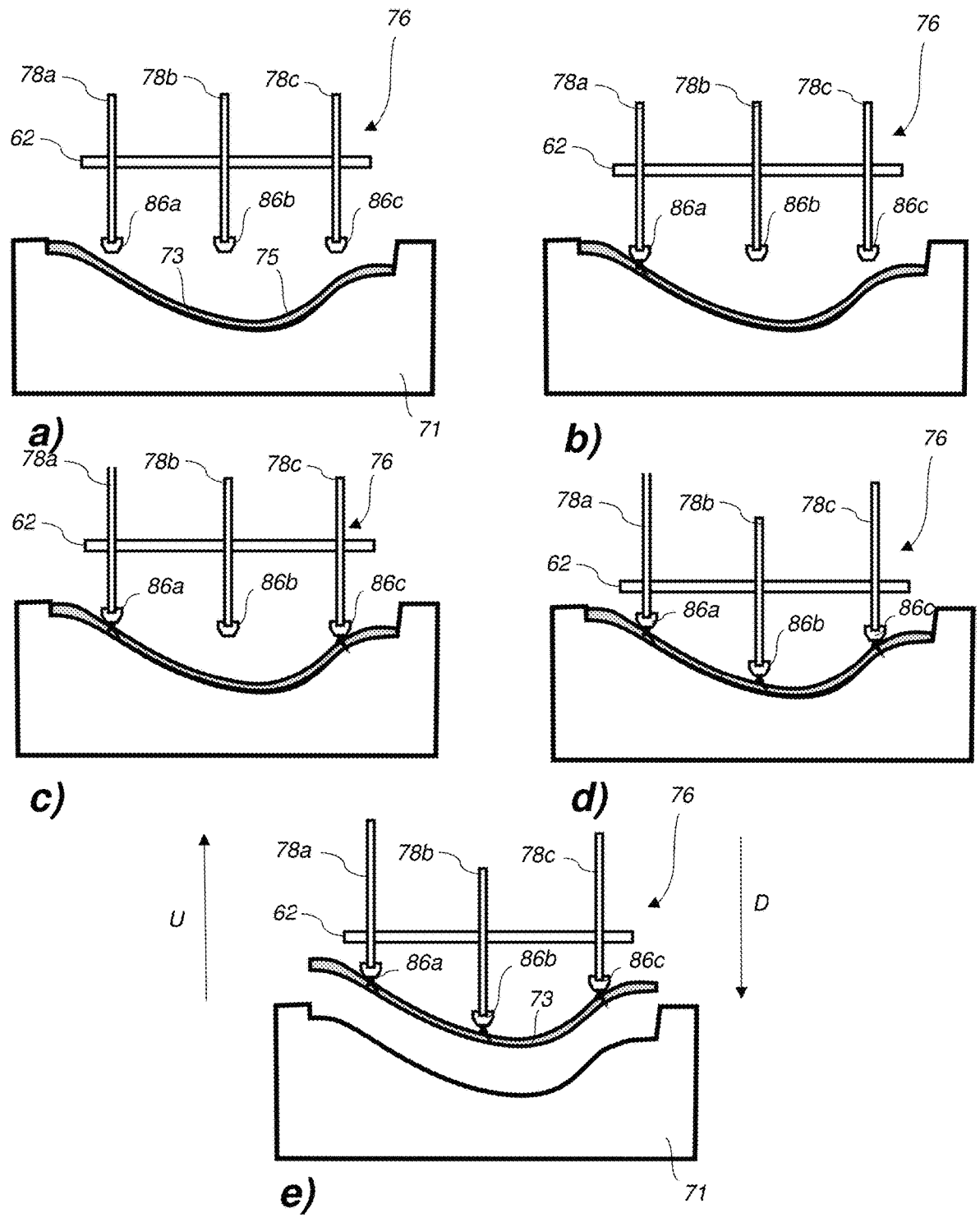
Figure 11:
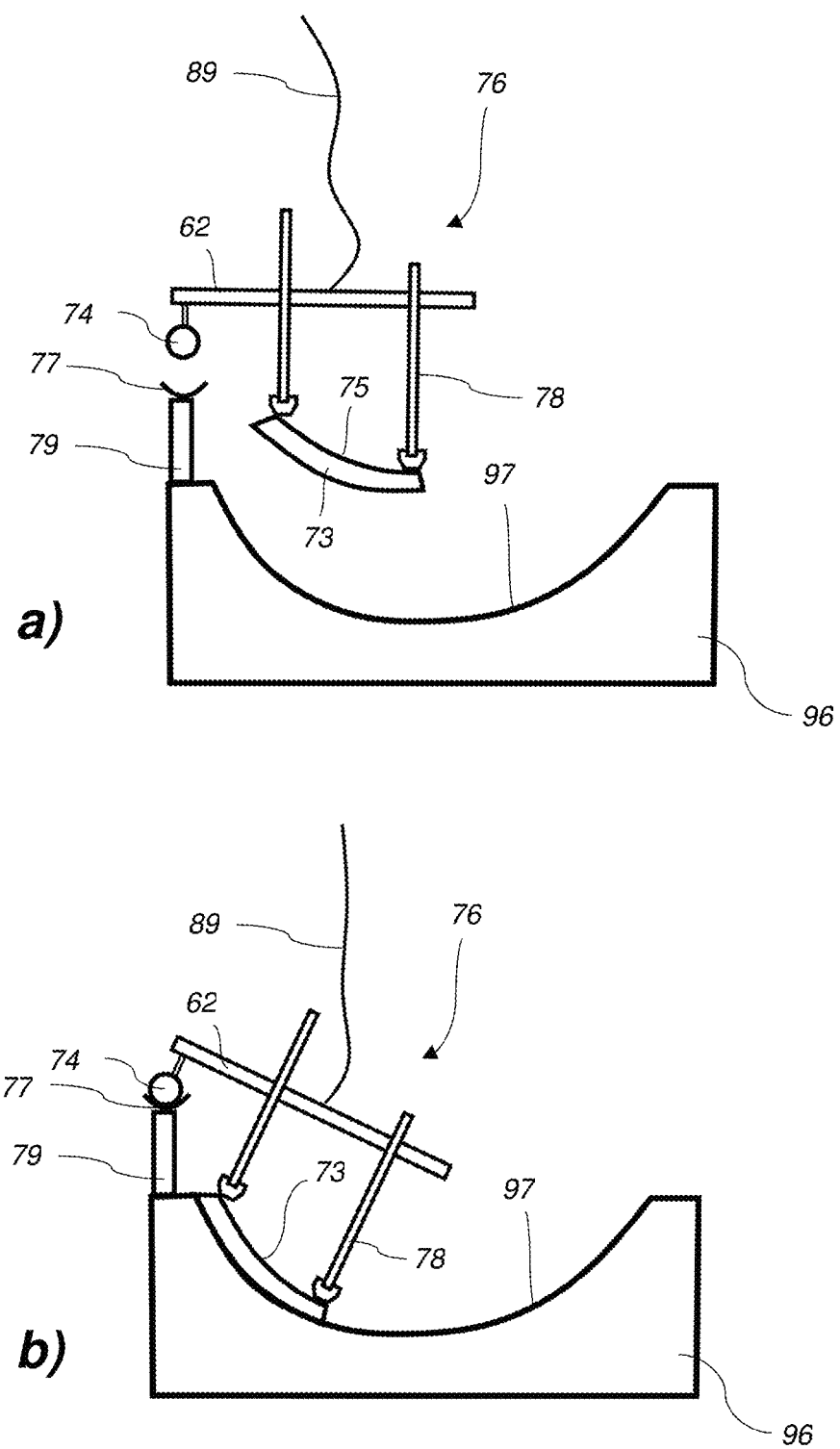

The invention is explained in detail below with reference to embodiments shown in the drawings, in which corresponding components are identified by the same reference numerals, wherein FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a perspective drawing of a blade mould for producing a wind turbine shell part according to the present invention, FIG. 6 is a perspective drawing of a base frame of a gripping device according to the present invention, FIG. 7 is a perspective drawing of a gripping device according to the present invention, FIG. 8 is an enlarged perspective view of a gripping member and a lock member according to the present invention, FIG. 9 is a perspective view of a socket arrangement for mounting on a blade mould according to the present invention, FIG. 10 is a schematic view of different steps of a method of transferring a preform for a wind turbine blade according to the present invention, and FIG. 11 is a schematic drawing illustrating the arrangement of a preform in a blade mould using the gripping device of the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as $\Delta y$, which corresponds to the out of plane deflection from a pitch axis 22 of the blade.

As illustrated in FIG. 5, a manufacturing process for manufacturing a blade part, such as a blade half, may involve laying a number of preforms 98a, 98b, 98c in a blade mould 96. For example, the preforms 98a, 98b, 98c are used for a blade section starting from the root end of the blade, such as the root region. The preforms 98a, 98b, 98c are arranged in the blade mould cavity 97, usually together with additional fibre material 94. Then, resin is infused to the blade mould cavity 97, which is subsequently cured or hardened in order to form the blade part, such as a blade half.

FIG. 6 illustrates a base frame 62 for a gripping device of the present invention. The base frame 62 may advantageously be suspended from a lifting device such as a crane or a hoist (not shown). The base frame of FIG. 6 comprises a plurality of vertically extending beams 64, a plurality of horizontally extending beams 66 in the longitudinal direction of the base frame 62, and a plurality of horizontally extending beams 68 in the transverse direction of the base frame 62.

Two horizontally extending sheath members 70 are arranged to receive respective angled support members 72, each support member 72 carrying a pivot connector 74 in the form of a ball member at its distal end. The pivot connector 74 is adapted for being received in a socket member 77 attached to a wind turbine blade mould of the type illustrated in FIG. 9. The socket member 77 may be affixed to a pole member 79 for attachment to a blade mould. Thus, when the preform held by the gripping device is suspended above a blade mould, one or more of the pivot connectors 74 may be received in one or more socket members 77 attached to the blade mould, such that the perform can be pivoted (turned) by simply lowering the same with a crane, without the need for further turning devices.

FIG. 7 illustrates an embodiment of the gripping device 76 of the present invention for lifting a preform for a wind turbine blade from a preform mould. The gripping device 76 comprises a base frame 62 of the type illustrated in FIG. 6 and a plurality of arms 78 slidably mounted on the base frame 62. The arms 78 may be mounted to the base frame 62 via one or more horizontally extending transverse support members 80. Alternatively, the arms could be mounted directly on the frame 62, for example on the horizontally extending beams 68 in the transverse direction of the base frame 62.

Each arm 78 has a proximal end 82 and a distal end 84, as also seen in the enlarged with of FIG. 8. The gripping device 76 further comprises a plurality of gripping members 86, such as needle grippers, for gripping a top surface of the preform, each gripping member being attached to the distal end 84 of at least one of the arms 78, either directly or via a connection member 88. The needle gripper 86 preferably releasably attaches to the preform upon contact with the top surface of the preform.

Each arm 78 also comprises a lock member 90, each lock member 90 for allowing sliding motion of the arm 78 relative to the base frame 62 in an upward direction while preventing sliding motion of the arm relative to the base frame in a downward direction. The lock member 90 may comprise a ratchet or a brake system. As best seen in FIG. 10, each arm 78 is individually slidable relative to the base frame 62. Each arm 78 may be slidably mounted within a slot 91 of a fixture 92 arranged on the base frame 62.

FIG. 10 illustrates a method of transferring a preform 73 for a wind turbine blade according to the present invention. The method comprises suspending a gripping device 76 according to the present invention over the preform 73, for example from a crane (not shown). In the illustrated embodiment the preform is manufactured in a preform mould 71 and is to be transferred to a blade mould for producing a shell half of a wind turbine blade. The gripping device 76 is lowered towards a top surface 75 of the preform 73 until a first gripping member 86a engages the top surface 75 of the preform 73; see FIG. 10b. the gripping device is further lowered until a second gripping member 86c engages the preform top surface 75; FIG. 10c. Meanwhile, the arm 78a carrying the first, already engaged gripping member 86a is moved upwards relative to the base frame as upward movement of the arms relative to the base frame 62 is allowed. The arms of the gripping device 76 are thus pushed upwards relative to the base frame 62 by the engaged preform top surface during the step of lowering the gripping device.

In FIG. 10d, also the last gripping member (needle gripper) 86 has engaged the top surface 75 of the preform 73, while the other two arms 78a, 78c have moved further upwards relative to the base frame 62. Subsequently, as seen in FIG. 10e, the gripping device is raised with the engaged preform for transporting and arranging the engaged preform 73 within a wind turbine blade mould (not shown). Downward movement of the arms 78a-c relative to the base frame 62 is prevented by the lock members. The upward direction U and the downward direction D are indicated in FIG. 10e. Thus, as seen in FIGS. 10a-e, the positions of the arms 78a-c relative to the base frame 62 is set by the top surface geometry of the preform.

FIG. 11 illustrates an arrangement of a preform in a blade mould using the gripping device of the present invention. The gripping device 76 comprises a pivot connector 74 in the form of a ball member 74. The pivot connector 74 is adapted for being received in a socket member 77 attached to an edge of a wind turbine blade mould 96 for moulding a blade shell half. FIG. 11 shows the blade mould 96 seen from its root end. The socket member 77 is affixed to a pole member 79 at the edge of the blade mould. The pole member 77 may be height-adjustable. In FIG. 11a, the preform 73 held by the gripping device 76 is suspended above the blade mould 96 using a rope or strap 89 held by a crane or similar lifting device (not shown). The ball member 74 is received in the socket 77 and subsequently the gripping device is further lowered to tilt the preform and to arrange the preform in the mould cavity 97 (FIG. 11b). Thus, the perform can be pivoted or tilted by simply lowering it using the lifting device, without the need for further turning devices.

The invention is not limited to the embodiments described herein and may be modified or adapted without departing from the scope of the present invention.

List of Reference Numerals 2 wind turbine
4 tower 6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 base frame
64 vertical beams
66 horizontal beams, longitudinal direction
68 horizontal beams, transverse direction
70 sheath member
71 preform mould
72 angled support member
73 preform
74 pivot connector
75 top surface of preform
76 gripping device
77 socket member
78 arms
79 pole member
80 transverse support members
82 proximal end of arm
84 distal end of arm
86 gripping member
88 connection member
89 strap
90 lock member
91 slot
92 fixture
94 fibre material
96 blade mould
97 blade mould cavity
98 preform
c chord length
$d_t$ position of maximum thickness
$d_f$ position of maximum camber
$d_p$ position of maximum pressure side camber
f camber
L blade length
r local radius, radial distance from blade root
t thickness
Δy prebend

The invention claimed is:

1. A gripping device (76) for lifting a preform (98) for a wind turbine blade from a preform mould (71), the gripping device (76) comprising:
a base frame (62) comprising one or more pivot connectors adapted for being received in a socket member attached to a wind turbine blade mould;
a plurality of arms (78) slidably mounted on the base frame (62), each of the arms (78) having a proximal end and a distal end;
a plurality of gripping members (86) for gripping a top surface (75) of the preform, each of the gripping members (86) being attached to the distal end of at least one of the arms (78); and
a plurality of lock members (90), each of the lock members being engaged with at least one of the arms (78) for allowing sliding motion of the at least one of the arms (78) relative to the base frame (62) in a first direction while preventing sliding motion of the at least one of the arms (78) relative to the base frame (62) in a second direction.

2. A gripping device (76) for lifting a preform (98) for a wind turbine blade from a preform mould (71), the gripping device (76) comprising:
a base frame (62);
a plurality of arms (78) slidably mounted on the base frame (62), each of the arms (78) having a proximal end and a distal end;
a plurality of gripping members (86) for gripping a top surface (75) of the preform, each of the gripping members (86) being attached to the distal end of at least one of the arms (78); and
a plurality of lock members (90), each of the lock members being engaged with at least one of the arms (78) for allowing sliding motion of the at least one of the arms (78) relative to the base frame (62) in a first direction while preventing sliding motion of the at least one of the arms (78) relative to the base frame (62) in a second direction, wherein the first direction is an upward direction and the second direction is a downward direction.

3. The gripping device (76) according to claim 2, wherein the lock member comprises a ratchet or a brake.

4. The gripping device (76) according to claim 2, wherein sliding motion of the arms (78) relative to the base frame (62) is achieved exclusively by the force of gravity.

5. The gripping device (76) according to claim 2, wherein the position of the arms (78) relative to the base frame (62) is not controlled by a computer or a control unit.

6. The gripping device (76) according to claim 2, wherein the gripping member (86) is a needle gripper.

7. The gripping device (76) according to claim 2, wherein the gripping member (86) releasably attaches to the preform upon contact with the top surface (75) of the preform.

8. The gripping device (76) according to claim 2, wherein each arm (78) is slidably arranged in a bracket or fixture mounted on the base frame (62).

9. The gripping device (76) according to claim 2, wherein the base frame (62) is suspended from a lifting device.

10. The gripping device (76) according to claim 9, wherein the lifting device comprises a crane or a hoist.

11. The gripping device (76) according to claim 2, wherein the base frame (62) further comprises one or more pivot connectors adapted for being received in a socket member attached to a wind turbine blade mould.

12. A method of transferring a preform for a wind turbine blade, the method comprising:
suspending a gripping device (76) over the preform, wherein the gripping device (76) comprises:
a base frame (62);
a plurality of arms (78) slidably mounted on the base frame (62), each of the arms (78) having a proximal end and a distal end;
a plurality of gripping members (86) for gripping a top surface (75) of the preform, each of the gripping members (86) being attached to the distal end of at least one of the arms (78); and a plurality of lock members (90), each of the lock members being engaged with at least one of the arms (78) for allowing sliding motion of the at least one of the arms (78) relative to the base frame (62) in a first direction while preventing sliding motion of the at least one of the arms (78) relative to the base frame (62) in a second direction, and wherein downward movement of one or more of the arms (78) relative to the base frame (62) is prevented by the plurality of lock members (90);

lowering the gripping device (76) towards a top surface (75) of the preform until one or more of the gripping members (86) engage the top surface (75) of the preform;

raising the gripping device (76) with the engaged preform;

arranging the engaged preform within a wind turbine blade mould; and disengaging the preform.

13. The method of transferring a preform for a wind turbine blade according to claim 12, wherein one or more of the arms (78) of the gripping device (76) are pushed upwards relative to the base frame (62) by the engaged preform top surface (75) during the step of lowering the gripping device (76).

14. The method of transferring a preform for a wind turbine blade according to claim 12, wherein the vertical position of one or more arms (78) of the gripping device (76) relative to the base frame (62) changes during the lowering step.

15. A method of manufacturing a wind turbine blade part, the method comprising:
   manufacturing one or more preforms of a wind turbine blade part in a preform mould (71);
   transferring each preform to a blade mould using the method of claim 12;
   infusing resin into the blade mould; and
   curing or hardening the resin in order to form the blade part.

* * * * *